United States Patent
Lee et al.

(10) Patent No.: US 10,914,836 B2
(45) Date of Patent: Feb. 9, 2021

(54) RADAR IMAGE PROCESSING METHOD, APPARATUS, AND SYSTEM

(71) Applicant: Samsung Electronics Co., Ltd., Suwon-si (KR)

(72) Inventors: Jaesup Lee, Yongin-si (KR); Sungdo Choi, Suwon-si (KR); Byung Kwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 15/920,990

(22) Filed: Mar. 14, 2018

(65) Prior Publication Data

US 2019/0079177 A1    Mar. 14, 2019

(30) Foreign Application Priority Data

Sep. 14, 2017   (KR) .......................... 10-2017-0117969

(51) Int. Cl.
| | |
|---|---|
| *G01S 13/90* | (2006.01) |
| *G01S 13/931* | (2020.01) |
| *G01S 13/87* | (2006.01) |
| *G01S 13/48* | (2006.01) |
| *G01S 13/42* | (2006.01) |

(Continued)

(52) U.S. Cl.
CPC ............ *G01S 13/90* (2013.01); *G01S 13/003* (2013.01); *G01S 13/422* (2013.01); *G01S 13/48* (2013.01); *G01S 13/87* (2013.01); *G01S 13/878* (2013.01); *G01S 13/931* (2013.01); *G01S 2007/4013* (2013.01); *G01S 2013/0245* (2013.01); *G01S 2013/93271* (2020.01); *G01S 2013/93272* (2020.01); *G01S 2013/93274* (2020.01)

(58) Field of Classification Search
CPC ...... G01S 13/90; G01S 13/003; G01S 13/422; G01S 13/48; G01S 13/87; G01S 13/878; G01S 13/931; G01S 2013/93274; G01S 2013/93721; G01S 2013/93271; G01S 2013/93272; G01S 2013/0245; G01S 2007/4013
USPC ....................................................... 342/25 A
See application file for complete search history.

(56) References Cited

U.S. PATENT DOCUMENTS 6,087,928 A * 7/2000 Kleinberg ............. G01S 13/931
340/436
8,624,773 B2    1/2014 Nguyen et al.
(Continued)

FOREIGN PATENT DOCUMENTS

DE    10 2006 047 605 A1    4/2008
DE    10 2014 104 273 A1    10/2015
(Continued)

OTHER PUBLICATIONS

Extended European Search Report dated Dec. 6, 2018, in counterpart European Patent Application No. 18173468.2 (8 pages in English).

*Primary Examiner* — Erin F Heard
*Assistant Examiner* — Michael W Justice
(74) *Attorney, Agent, or Firm* — NSIP Law

(57) ABSTRACT

A radar image processing method includes acquiring captured images from radars synchronized to perform beamforming on a same point at a same time, synthesizing the captured images based on at least one overlapping area of the captured images, and generating a high-resolution image based on the synthesized images.

26 Claims, 15 Drawing Sheets

(51) Int. Cl.
*G01S 13/00* (2006.01)
*G01S 7/40* (2006.01)
*G01S 13/02* (2006.01)

(56) References Cited

U.S. PATENT DOCUMENTS

| | | |
|---|---|---|
| 8,912,943 B2 | 12/2014 | Apostolos et al. |
| 8,917,199 B2 | 12/2014 | Samaniego et al. |
| 9,199,643 B1 | 12/2015 | Zeng |
| 9,274,219 B2 | 3/2016 | Lamb |
| 9,400,329 B2 | 7/2016 | Pillay |
| 10,324,179 B2* | 6/2019 | Ling .................. G01S 13/42 |
| 2009/0315761 A1* | 12/2009 | Walter ................ G01S 13/345 342/200 |
| 2010/0117813 A1* | 5/2010 | Lee ...................... B60Q 9/008 340/435 |
| 2010/0152963 A1* | 6/2010 | Heckel ................ B60W 30/17 701/29.2 |
| 2012/0290169 A1* | 11/2012 | Zeng ................... G01S 7/4026 701/30.2 |
| 2014/0266868 A1* | 9/2014 | Schuman ............ G01S 13/9029 342/25 B |
| 2016/0019458 A1 | 1/2016 | Kaufhold |
| 2016/0116582 A1 | 4/2016 | Chang |
| 2016/0131753 A1 | 5/2016 | Brown |
| 2016/0349363 A1* | 12/2016 | Millar ................... G01S 13/89 |
| 2017/0236423 A1* | 8/2017 | Bowers ................. G08G 1/16 340/903 |
| 2019/0339382 A1* | 11/2019 | Hess ...................... G01S 7/04 |

FOREIGN PATENT DOCUMENTS

| | | |
|---|---|---|
| KR | 10-2012-0000842 A | 1/2012 |
| KR | 10-1615151 B1 | 4/2016 |

* cited by examiner

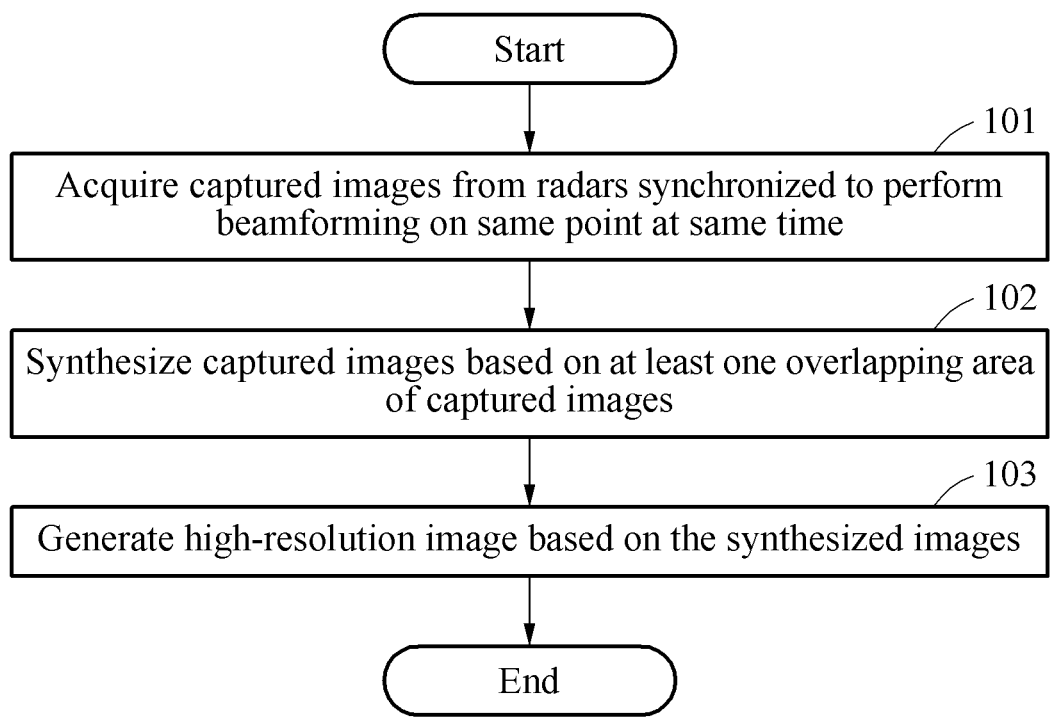

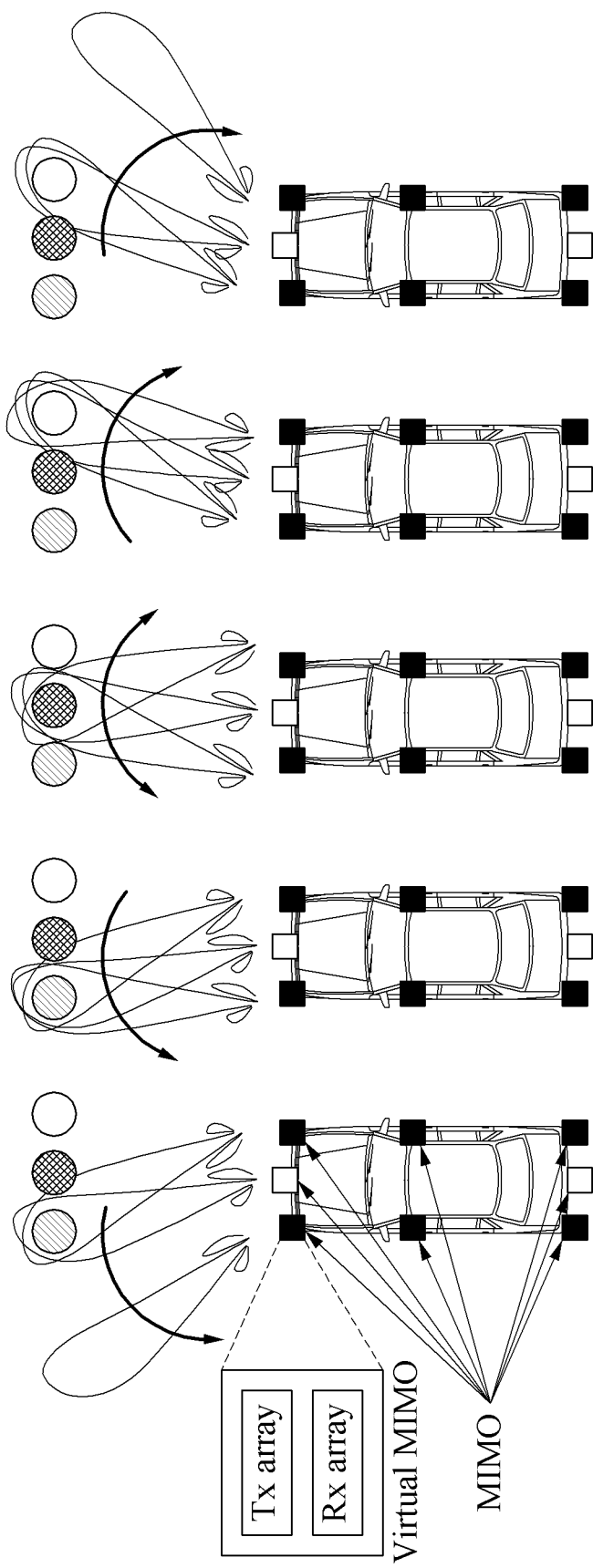

RADAR IMAGE PROCESSING METHOD, APPARATUS, AND SYSTEM

CROSS-REFERENCE TO RELATED APPLICATIONS

This application claims the benefit under 35 USC 119(a) of Korean Patent Application No. 10-2017-0117969 filed on Sep. 14, 2017, in the Korean Intellectual Property Office, the entire disclosure of which is incorporated herein by reference for all purposes.

BACKGROUND

1. Field

The following description relates to a method, an apparatus, and a system for processing a radar image.

2. Description of Related Art

Radars are used to detect and classify objects and to sense and analyze a movement of an object. Radars are mounted in various platforms, for example, a platform for a satellite or a military device. Recently, radars have been mounted in vehicles and utilized to analyze an image. Because an autonomous vehicle needs to detect and respond to an object and surroundings at a relatively high speed, a scheme of mounting radars and an image processing scheme are important issues in autonomous vehicle-related technologies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a radar image processing method includes acquiring captured images from radars synchronized with each other to perform beamforming on a same point at a same time; synthesizing the captured images based on at least one overlapping area of the captured images; and generating a high-resolution image based on the synthesized images.

An angle range of the overlapping area may satisfy a predetermined condition.

The radars may be synchronized with each other to sequentially perform beamforming on points at a same distance from a vehicle.

The radars may be synchronized with each other to sequentially perform beamforming on points at different locations relative to a vehicle along a predefined path.

Transmission times for transmitting transmission signals from the radars toward a target are synchronized with each other, and reception times for receiving reflection signals generated by the transmission signals reflecting from the target toward the radars are synchronized with each other.

The radars may form a multiple-input and multiple-output (MIMO), and at least one of the radars may include a virtual MIMO radar.

Transmission signals transmitted from the radars toward a target are coded differently from one another, a first radar among the radars may be configured to receive first reception signals respectively generated by the transmission signals reflecting from the target, and a second radar among the radars may be configured to receive second reception signals respectively generated by the transmission signals reflecting from the target.

The acquiring of the captured images may include acquiring a first captured image from the first radar based on the first reception signals; and acquiring a second captured image from the second radar based on the second reception signals.

At least one of the radars may be installed to scan any one or any combination of a front side of a vehicle, a rear side of the vehicle, and both sides of the vehicle.

Gains of at least two of the radars may be different from one another, and the radar image processing method may further include detecting an object based on at least one of the captured images acquired from the radars having the different gains.

The generating of the high-resolution image may include generating, in response to the object being detected, a high-resolution image having an object detection range greater than respective object detection ranges of the captured images.

The radar image processing may further include determining a current mode among modes; and controlling a beamforming range of at least one of the radars based on the current mode.

The controlling of the beamforming range may include limiting the beamforming range to a front side of a vehicle.

The determining of the current mode may include determining the current mode based on any one or any combination of a speed of a vehicle, an acceleration of the vehicle, a location of the vehicle, and surroundings of the vehicle, and the modes may include a highway-driving mode and a city-driving mode.

In another general aspect, a non-transitory computer-readable medium stores instructions that, when executed by a processor, cause the processor to perform the method described above.

In another general aspect, a radar image processing apparatus includes a memory configured to store instructions; and a processor configured execute the instructions stored in the memory to acquire captured images from radars synchronized with each other to perform beamforming on a same point at a same time, synthesize the captured images based on at least one overlapping area of the captured images, and generate a high-resolution image based on the synthesized images.

The processor may be further configured to synchronize the radars with each other to sequentially perform beamforming on points at a same distance from a vehicle.

The processor may be further configured to synchronize the radars with each other to sequentially perform beamforming on points at different locations relative to a vehicle along a predefined path.

The processor may be further configured to set gains of at least two of the radars to be different from one another, and detect an object based on at least one of the captured images acquired from the radars.

The processor may be further configured to determine a current mode among modes, and control a beamforming range of at least one of the radars based on the current mode.

The radars may form a multiple-input and multiple-output (MIMO), the processor may be further configured to control the radars of the MIMO, and at least one of the radars may include a virtual MIMO radar.

In another general aspect, a radar image processing system includes radars; a memory configured to store instructions; and a processor configured to execute the instructions stored in the memory to synchronize the radars with each other to perform beamforming on a same point at a same time, acquire captured images from the radars, synthesize the captured images based on at least one overlapping area of the captured images, and generate a high-resolution image based on the synthesized images.

In another general aspect, a radar image processing method includes acquiring captured images from radars mounted on a platform, the radars including a first long-range radar (LRR) mounted at a front of the platform, a second LRR mounted at a rear of the platform, a first short-range radar (SRR) mounted at the front of the platform on one side of the first LRR, a second SRR mounted at the front of the platform on an opposite side of the first LRR from the first SRR, a third SRR mounted at one side of the platform between the front of the platform and the rear of the platform, a fourth SRR mounted at an opposite side of the platform from the one side of the platform between the front of the platform and the rear of the platform, a fifth SRR mounted at the rear of the platform on one side of the second LRR, and a sixth SRR mounted at the rear of the platform on an opposite side of the second LRR from the one LRR; synthesizing the captured images based on overlapping areas of the captured images to obtain an image having a 360° field of view; and generating a high-resolution image based on the synthesized images.

The first LRR, the first SRR, and the second SRR may be synchronized with each other to perform beamforming on a same point at a same time; and the generating of the high-resolution image may include generating a high-resolution image of an area in front of the platform based on captured images captured by the first LRR, the first SRR, and the second SRR synchronized with each other.

Gains of the first LRR, first SRR, and second SRR may be different from each other.

The first SRR may transmit a first transmission signal toward a target; the first LRR may transmit a second transmission signal toward the target; the second SRR may transmit a third transmission signal toward the target; the acquiring of the captured images may include acquiring a first reception image from the first SRR based on a first reception signal received by the first SRR and generated by the first transmission signal reflecting from the target, a second reception signal received by the first SRR and generated by the second transmission signal reflecting from the target, and a third reception signal received by the first SRR and generated by the third transmission signal reflecting from the target, acquiring a second reception image from the first LRR based on a fourth reception signal received by the first LRR and generated by the first transmission signal reflecting from the target, a fifth reception signal received by the first LRR and generated by the second transmission signal reflecting from the target, and a sixth reception signal received by the first LRR and generated by the third transmission signal reflecting from the target; and acquiring a third reception image from the second SRR based on a seventh reception signal received by the second SRR and generated by the first transmission signal reflecting from the target, an eighth reception signal received by the second SRR and generated by the second transmission signal reflecting from the target, and a ninth reception signal received by the second SRR and generated by the third transmission signal reflecting from the target; and the generating of the high-resolution image may include generating the high-resolution image based on the first reception image, the second reception image, and the third reception image.

The image processing method may further include controlling beamforming ranges of the first SRR, the first LRR, and the second SRR to limit the beamforming ranges of the first SRR, the first LRR, and the second SRR to an area in front of the platform in a highway-driving mode; and controlling beamforming ranges of the first SRR, the first LRR, and the second SRR to be maximum beamforming ranges of the first SRR, the first LRR, and the second SRR in a city-driving mode.

Other features and aspects will be apparent from the following detailed description, the drawings, and the claims.

BRIEF DESCRIPTION OF THE DRAWINGS

FIG. 1 illustrates an example of a radar image processing method.

FIG. 3A illustrates an example of a beamforming technique of radars.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 2A:
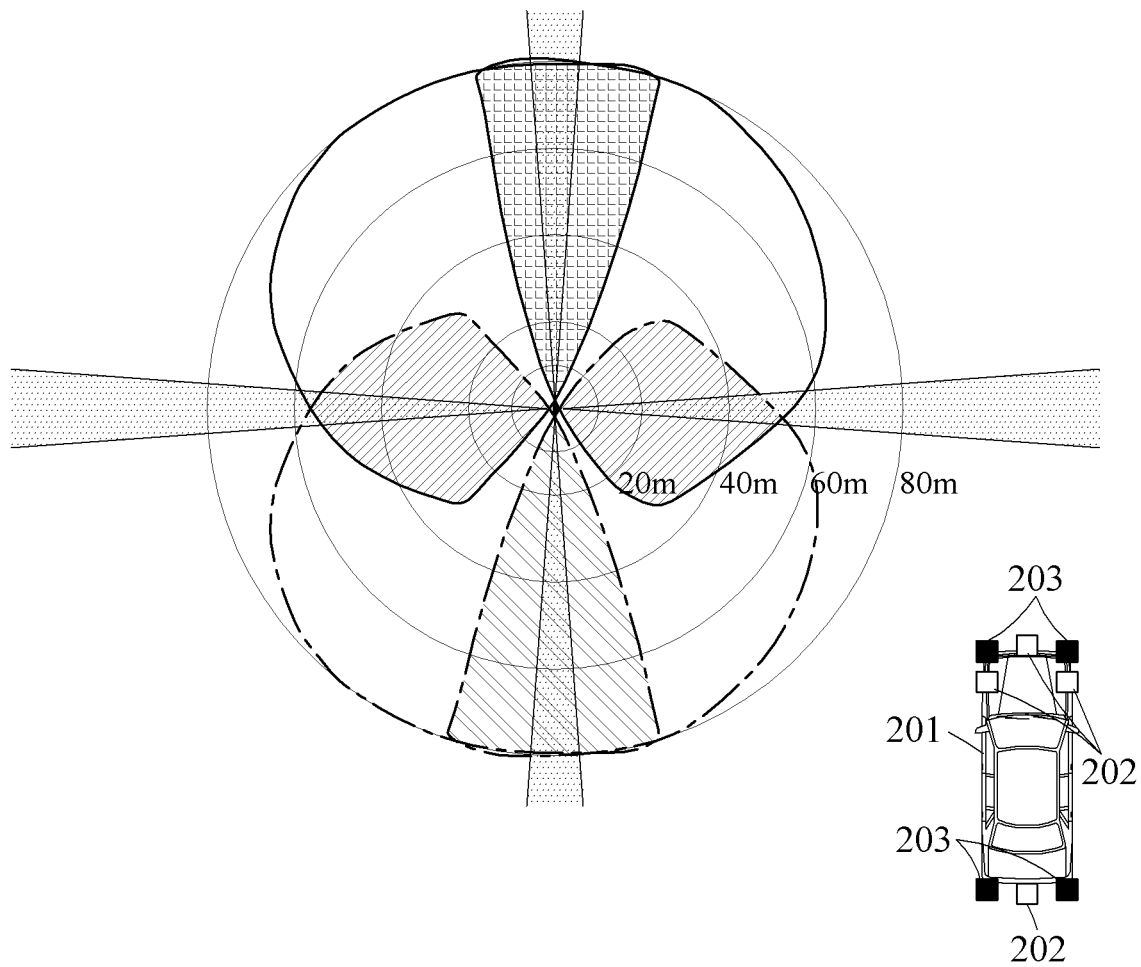
FIG. 2A illustrates an example in which captured images of radars are synthesized.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein, including technical or scientific terms, have the same meanings as those generally understood by one of ordinary skill in the art. Terms defined in dictionaries generally used are to be construed to have meanings matching with contextual meanings in the related art, and are not to be construed as having an ideal or excessively formal meaning unless otherwise defined herein.

FIG. 1 illustrates an example of a radar image processing method.

A radar image processing apparatus is an apparatus configured to collect, process, store, or transmit information acquired from a radar, or to control the radar. The radar image processing apparatus is implemented as, for example, one or more processors configured to execute instructions stored in or on a non-transitory computer-readable medium, dedicated hardware, or various combinations thereof. In one example, the radar image processing apparatus is mounted in a platform with a radar. In another example, the radar image processing apparatus is outside the platform with the radar, processes information acquired from the radar, and remotely controls the radar.

A radar may be mounted in various types of platforms. For example, at least one radar is mounted in a vehicle, a satellite, or a military device. The vehicle may be, for example, an autonomous vehicle. The autonomous vehicle is a vehicle that drives itself using an autonomous driving device. In one example, the radar image processing apparatus generates a high-resolution image based on an image or information acquired from at least one radar mounted in an autonomous vehicle, and increases and controls a detection range of the radar. In another example, the radar image processing apparatus senses nearby vehicles in a vicinity of an autonomous vehicle based on an image or information acquired from at least one radar mounted in the autonomous vehicle, recognizes a nearby vehicle, and stores a recognition result. The nearby vehicles may be, for example, vehicles located in front of, behind, or on both sides of the autonomous vehicle. In another example, the radar image processing apparatus identifies nearby vehicles based on an image or information acquired from at least one radar mounted in an autonomous vehicle, tracks and stores speeds of the nearby vehicles, a distance to the autonomous vehicle, a distance between the nearby vehicles, or a current lane, and identifies and recognizes an object and surroundings in the vicinity of the autonomous vehicle.

Referring to FIG. 1, in operation 101, the radar image processing apparatus acquires captured images from radars synchronized to perform beamforming on a same point at a same time. In one example, radars mounted in a vehicle are synchronized to perform beamforming on a same point at a same time. In another example, the radar image processing apparatus controls radars mounted in a vehicle in real time, and the radars are synchronized to perform beamforming on a same point at a same time based on a control of the radar image processing apparatus. In this example, the synchronizing of the radars indicates that timings at which the radars perform beamforming on the same target are synchronized. Beamforming targets of radars change at regular intervals, or change based on the control of the radar image processing apparatus over time. Examples of an arrangement of radars installed in a vehicle will be described below with reference to FIGS. 2A and 2B. Examples of synchronized radars will be described below with reference to FIGS. 3A, 3B, and 3C.

In operation 102, the radar image processing apparatus synthesizes the captured images based on at least one overlapping area of the captured images. For example, the captured images overlap each other, and the radar image processing apparatus controls beamforming of the radars so that the captured images overlap each other in at least one overlapping area. The beamforming of the radars may be set in advance. The radar image processing apparatus synthesizes, using a synthetic aperture radar (SAR), the captured images and processes a radar image.

In operation 103, the radar image processing apparatus generates a high-resolution image based on the synthesized images. To accurately identify and recognize an object, a resolution of a radar image needs to be increased. The radar image processing apparatus synthesizes the captured images that are acquired from the radars, compares the synthesized images to an individual radar image, and generates an image having a relatively high resolution. Examples in which captured images are synthesized and a high-resolution image is generated will be described below with reference to FIGS. 2A and 2B.

FIG. 2A illustrates an example in which captured images of radars are synthesized.

Referring to FIG. 2A, the captured images of the radars include at least one overlapping area, and an angle range of the overlapping area satisfies a predetermined condition. A vehicle 201 includes long-range radars (LRRs) 202 and short-range radars (SRRs) 203. For example, a detection range of an LRR is set based on about 20 degrees, and a detection range of an SRR is set based on about ±75 degrees. FIG. 2A illustrates beam patterns formed by the LRRs 202 and the SRRs 203 in the vehicle 201, and a radar image processing apparatus synthesizes the captured images based on overlapping areas. As can be seen from FIG. 2A, the detection range of the SRR 203 on the left front side of the vehicle 201 (the upper left corner of the vehicle 201 in FIG. 2A) overlaps the detection range of the SRR 203 on the right front side of the vehicle 201, the detection range of the LRR 202 on the front side of the vehicle 201, the detection range of the LRR 202 on the left side of the vehicle 202, and the detection range of the SRR 203 on the left rear side of the vehicle 201. Similar overlappings occur between the detection ranges of other ones of the LRRs 202 and the SRRs 203. Overlapping areas of the detection ranges corresponding to overlapping areas in the captured images are indicated by the hatched areas in FIG. 2A. As can be seen from FIG. 2A, a total angle range of the overlapping areas in the captured images is less than 360 degrees because there are four areas where the detection ranges do not overlap.

Figure 2B:
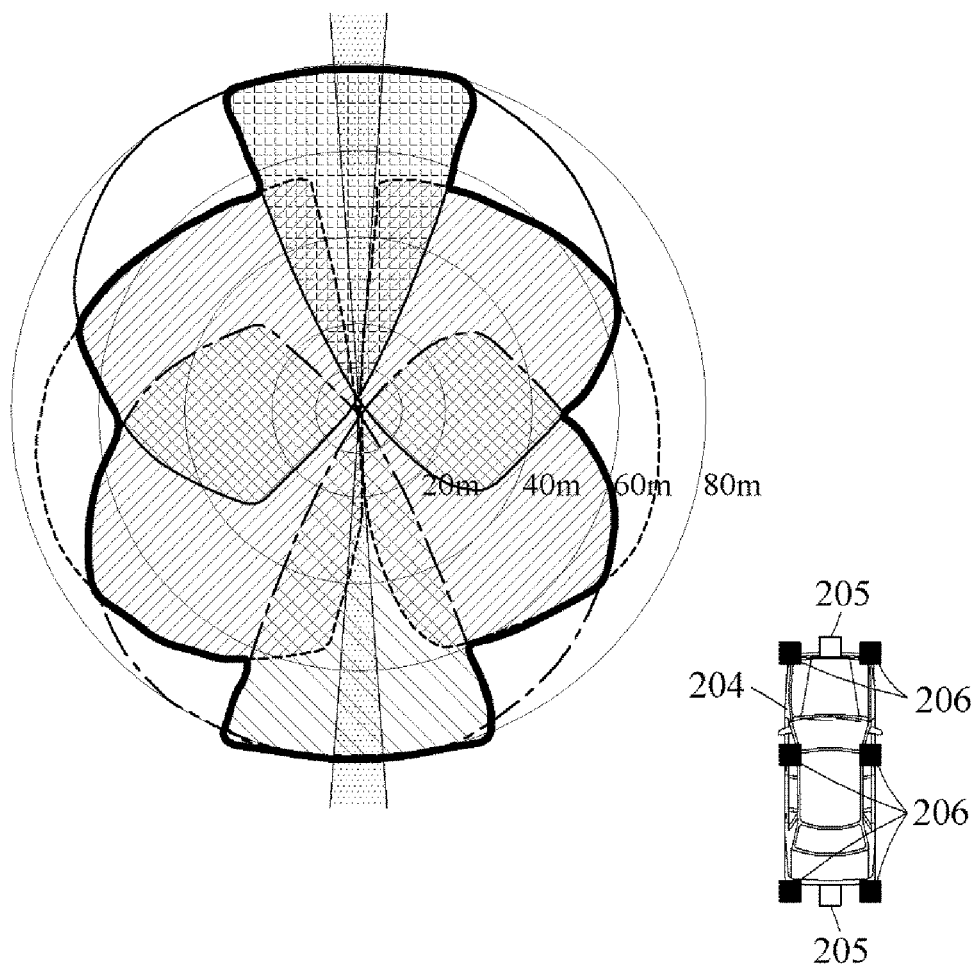
FIG. 2B illustrates another example in which captured images of radars are synthesized.

FIG. 2B illustrates another example in which captured images of radars are synthesized.

Referring to FIG. 2B, a vehicle 204 includes LRRs 205 and SRRs 206. LRRs 202 on sides of the vehicle 201 of FIG. 2A are replaced with SRRs 206, and accordingly overlapping areas of the detection ranges are extended so that a total angle range of the overlapping areas in the captured images is 360 degrees. FIG. 2B illustrates beam patterns formed by the LRRs 205 and the SRRs 206 in the vehicle 204, and a radar image processing apparatus synthesizes the captured images based on overlapping areas. At least a portion of the radars are installed to scan any one or any combination of a front side, a rear side, and both sides of a vehicle. However, a configuration in which radars are mounted or installed is not limited to the above description or drawings, and accordingly may be modified or applied by various techniques or schemes.

Because the captured images overlap each other, the radar image processing apparatus generates high-resolution images that correspond to both an inside and an outside of a turn when a vehicle turns a corner. The radar image processing apparatus controls the radars in real time so that the captured images overlap each other, controls an angle range of an overlapping area to 360 degrees, and generates a high-resolution image with a 360-degree range. The radar image processing apparatus provides a scheme of increasing an antenna aperture based on overlapping images with a 360-degree range, and increases an antenna aperture-related performance (for example, an effective antenna aperture ratio). By increasing the antenna aperture-related performance, the radar image processing apparatus performs image processing in a range of 360 degrees and generates a high-resolution image.

The radar image processing apparatus generates a high-resolution image based on the captured images that overlap each other, even when a vehicle is stationary. The radar image processing apparatus increases the angle range of the overlapping area and generates high-resolution images corresponding to a front side and a rear side of the vehicle.

FIG. 3A illustrates an example of a beamforming technique of radars.

Referring to FIG. 3A, radars for capturing of images are synchronized to simultaneously capture a predetermined object. The synchronizing may be set in advance, or may be controlled in real time by a radar image processing apparatus. For example, when synchronizing of radars is set in advance, the radars automatically change beamforming directions at predetermined intervals.

In one example, radars of a vehicle (for example, radars mounted in a front side of the vehicle) are synchronized to sequentially perform beamforming on points at the same distance from the vehicle. In FIG. 3A, the radars mounted in the front side of the vehicle are synchronized to sequentially perform beamforming on objects at the same distance from the vehicle. For example, the radar image processing apparatus sets modes of the radars to auto spotlight modes, and radars mounted in any one or any combination of the front side and a rear side of the vehicle sequentially perform beamforming on points at the same distance from the vehicle. The radar image processing apparatus acquires captured images through beamforming of the same object from a plurality of radars (for example, at least three radars), and generates a high-resolution image corresponding to the object based on overlapping areas of the captured images.

The radar image processing apparatus generates a high-resolution image in real time based on the captured images acquired by performing beamforming on the same object. Because the radars are synchronized to perform beamforming on the same object, the radar image processing apparatus is suitable to process a high-resolution image corresponding to overlapping areas in real time. For example, the radar image processing apparatus acquires captured images through beamforming of the same object from at least three radars installed in a front side of a vehicle to process a high-resolution image corresponding to the object in real time during traveling of the vehicle.

Radars form a single multiple-input and multiple-output (MIMO) under the control of the radar image processing apparatus. The radar image processing apparatus receives, in real time, captured images that overlap each other from the radars of the MIMO, and accordingly generates and processes, in real time, a high-resolution image corresponding to surroundings of a vehicle that is traveling. Each of the radars adjusts a beamforming direction based on a control of the radar image processing apparatus. The radars of the MIMO are wholly responsible for a beamforming operation, and an operation of processing information acquired from the radars is performed by the radar image processing apparatus. Also, a preprocessing or processing operation associated with captured images of radars is performed by a processor mounted in each of the radars, and various techniques may be employed in examples in which image processing-related operations are shared based on a design intention.

At least one of the radars includes, for example, a virtual MIMO radar. The virtual MIMO radar includes a transmitter array and a receiver array, and an antenna performance of a radar is increased by the virtual MIMO radar. The radar image processing apparatus generates high-resolution images corresponding to a front side and a rear side of a vehicle based on captured images using a processing technique of a synthetic aperture radar (SAR). The captured images are acquired through beamforming performed by the radars that form the MIMO under the control of the radar image processing apparatus and by the transmitter arrays and the receiver arrays included in the virtual MIMO radar based on each of the radars.

Figure 3B:
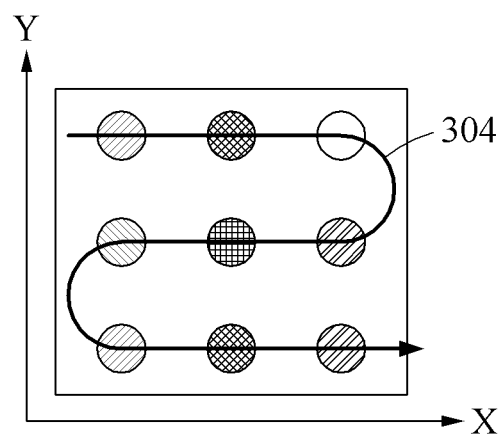
FIG. 3B illustrates another example of a beamforming technique of radars.

FIG. 3B illustrates another example of a beamforming technique of radars.

Referring to FIG. 3B, radars for capturing of images are synchronized to sequentially perform beamforming on points at different locations relative to a vehicle along a predefined path 304. The synchronizing may be set in advance, or may be controlled in real time by a radar image processing apparatus. In FIG. 3B, a Y-axis corresponds to points in a vertical direction of the vehicle among points away from the vehicle, and an X-axis corresponds to points in a horizontal direction of the vehicle among the points away from the vehicle. A dimension corresponding to a height from a ground is not illustrated in FIG. 3B.

The radar image processing apparatus acquires captured images from radars that sequentially perform beamforming along a predefined path, and generates high-resolution images based on the acquired images along the predefined path in real time. As described above, a path for the beamforming may be set in advance, and the radars automatically perform beamforming along the set path, or the radars may perform beamforming along a predetermined path based on a control of the radar image processing apparatus. Because the radars perform beamforming on the same point at the same point in time as described above, the radar image processing apparatus generates and processes a high-resolution image corresponding to a predetermined point in time in real time. For example, the radar image processing apparatus generates and processes, in real time, an image with a resolution high enough to identify and classify an object.

Figure 3C:
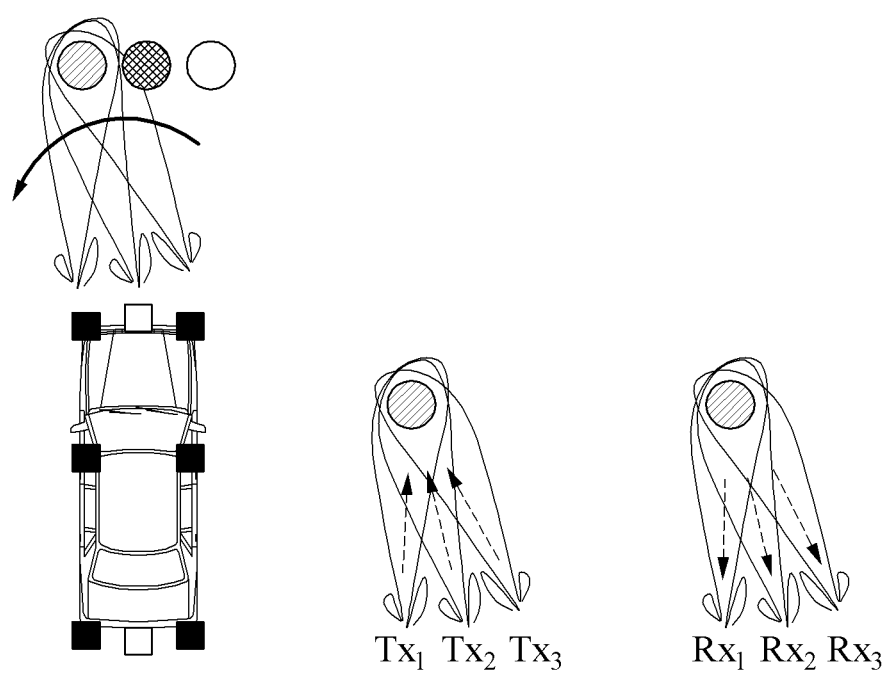
FIG. 3C illustrates another example of a beamforming technique of radars.

FIG. 3C illustrates another example of a beamforming technique of radars.

Referring to FIG. 3C, transmission times $Tx_1$, $Tx_2$, and $Tx_3$ of transmission signals transmitted from radars toward a target are synchronized with each other, and reception times $Rx_1$, $Rx_2$, and $Rx_3$ of reception signals are synchronized with each other. The reception signals are the transmission signals reflected from the target back to the radars. For example, the transmission times $Tx_1$, $Tx_2$, and $Tx_3$ are the same, and the reception times $Rx_1$, $Rx_2$, and $Rx_3$ are the same. A radar image processing apparatus collects a large quantity of data in the same time slot among time slots to process operations, and accordingly processes a high-resolution image, regardless of a speed of a vehicle or whether the vehicle is stationary. The radar image processing apparatus enables a gain of a transmission signal to be greater than a gain of a reception signal, and increases a performance of image processing, when a vehicle is moving. A gain of a signal may be set in advance or may be controlled by the radar image processing apparatus. An example in which a gain is adjusted or changed may be variously modified based on a design intention.

Figure 3D:
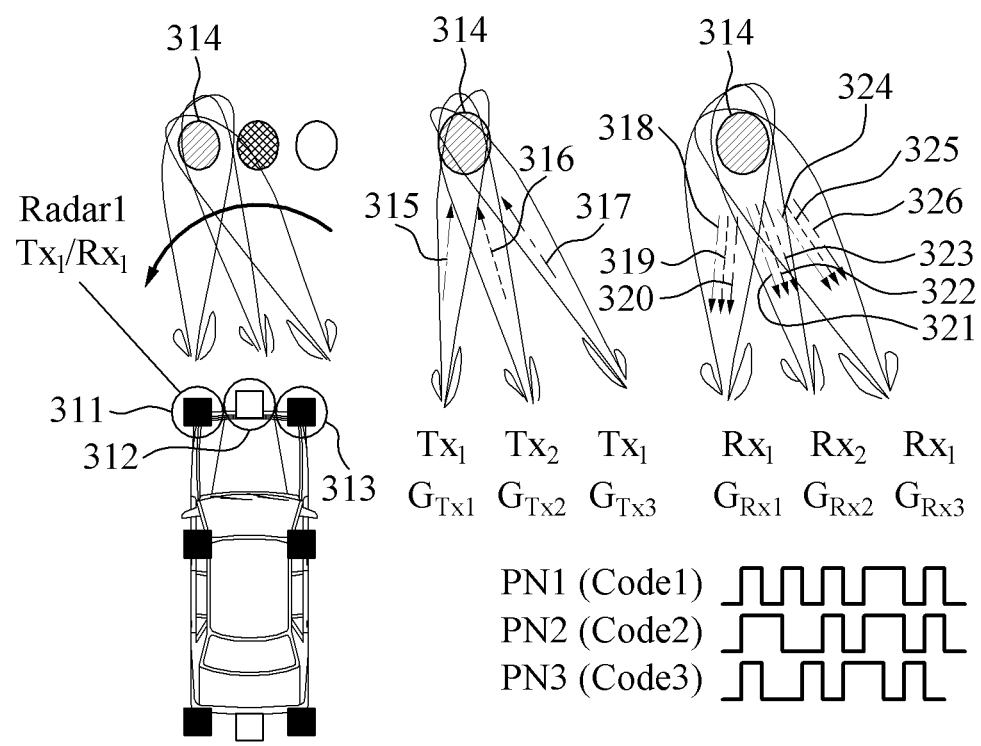
FIG. 3D illustrates another example of a beamforming technique of radars.
Figure 3E:
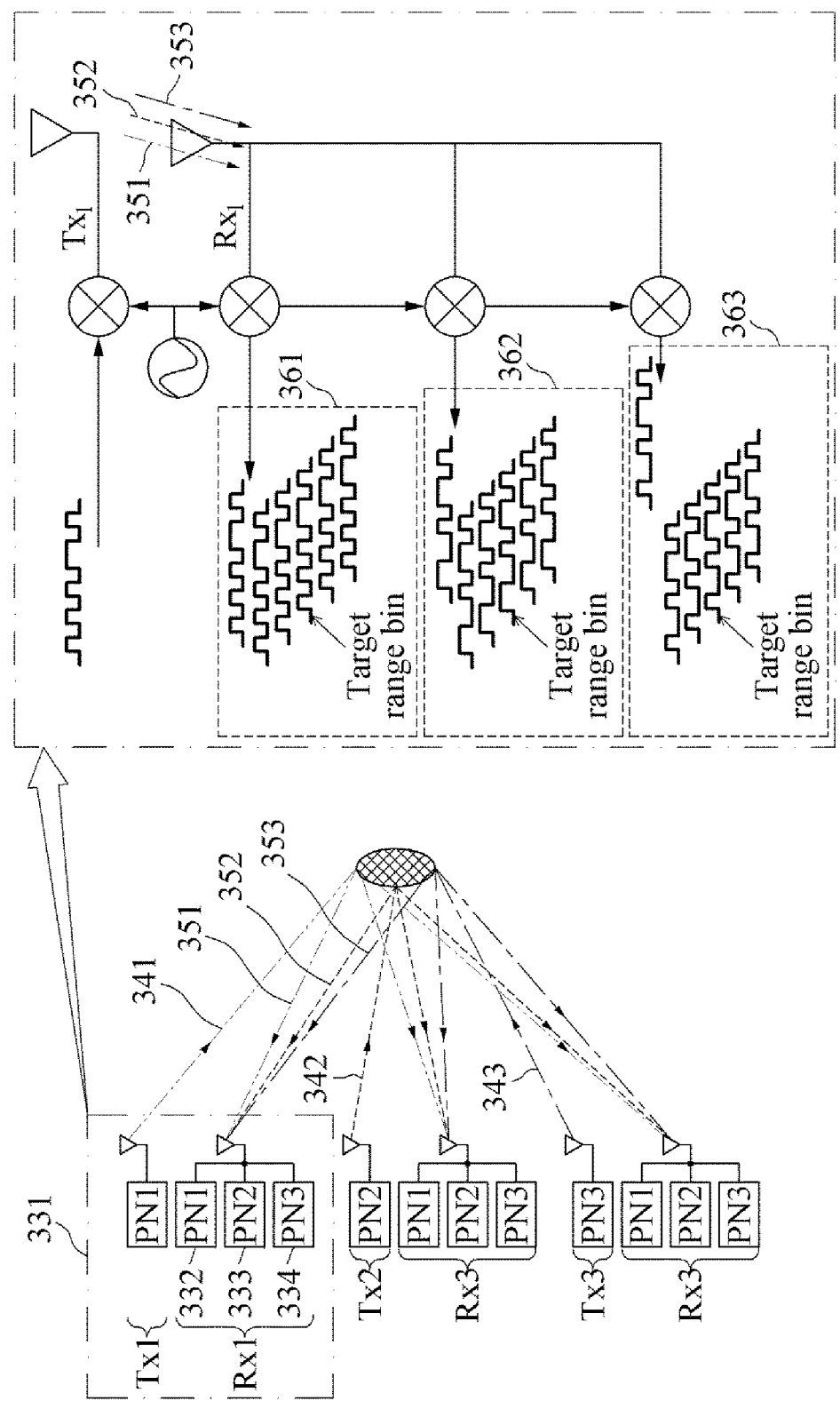
FIG. 3E illustrates another example of a beamforming technique of radars.

FIGS. 3D and 3E illustrate other examples of a beamforming technique of radars.

A radar image processing apparatus acquires data for a generation of a high-resolution image based on signals of radars that are coded differently from one another. For example, the radar image processing apparatus acquires a large quantity of data using a phase-modulated continuous-wave (PMCW) MIMO radar technique or a code-division multiple access (CDMA) MIMO radar technique, in comparison to when data for generation of an image is acquired without using a coding technique with a limited number of radars. Also, the radar image processing apparatus increases a resolution performance by acquiring a larger quantity of data. The radar image processing apparatus generates a high-resolution image based on signals that are coded differently from one another so that information acquired from radars overlap robustly against interference.

Referring to FIG. 3D, a first transmission signal 315, a second transmission signal 316, and a third transmission signal 317 transmitted from a first radar 311, a second radar 312, and a third radar 313 toward a target 314 are coded differently from one another. A radar image processing apparatus acquires data for a generation of a high-resolution image based on a first reception signal 318 through a ninth reception signal 326 that correspond to the first transmission signal 315 through the third transmission signal 317 reflected from the target 314. That is, the first reception signal 318 received by the first radar 311, a fourth reception signal 321 received by the second radar 312, and a seventh reception signal received by the third radar 313 correspond to the first transmission signal 315 reflected from the target 314, a second reception signal 319 received by the first radar 311, a fifth reception signal 322 received by the second radar 312, and an eighth reception signal 325 received by the third radar 313 correspond to the second transmission signal 316 reflected from the target 314, and a third reception signal 320 received by the first radar 311, a sixth reception signal 323 received by the second radar 312, and the ninth reception signal 326 received by the third radar 313 correspond to the third transmission signal 317 reflected from the target 314.

The first radar 311 includes a first transmitter $Tx_1$ and a first receiver $Rx_1$, and the first transmission signal 315 is transmitted with a gain $G_{Tx1}$ from the first transmitter $Tx_1$ and is coded as a first pseudo-noise (PN) code PN1. The second radar 312 includes a second transmitter $Tx_2$ and a second receiver $Rx_2$, and the second transmission signal 316 is transmitted with a gain $G_{Tx2}$ from the second transmitter $Tx_2$ and is coded as a second PN code PN2. The third radar 313 includes a third transmitter $Tx_3$ and a third receiver $Rx_3$, and the third transmission signal 317 is transmitted with a gain $G_{Tx3}$ from the third transmitter $Tx_3$ and is coded as a third PN code PN3.

The first receiver $Rx_1$ of the first radar 311 receives the first reception signal 318, the second reception signal 319, and the third reception signal 320 that respectively correspond to the first transmission signal 315, the second transmission signal 316, and the third transmission signal 317 that are reflected from the target 314. The second receiver $Rx_2$ of the second radar 312 receives the fourth reception signal 321, the fifth reception signal 322, and the sixth reception signal 323 that respectively correspond to the first transmission signal 315, the second transmission signal 316, and the third transmission signal 317 that are reflected from the target 314. The third receiver $Rx_3$ of the third radar 311 receives the seventh reception signal 324, the eighth reception signal 325 and the ninth reception signal 326 that respectively correspond to the first transmission signal 315, the second transmission signal 316, and the third transmission signal 317 that are reflected from the target 314.

The radar image processing apparatus uses the first reception signal 318 through the ninth reception signal 326 to generate a high-resolution image of the target 314. The first reception signal 318 through the ninth reception signal 326 correspond to the first transmission signal 315 through the third transmission signal 317 that are coded differently from one another, and accordingly the first reception signal 318 through the third reception signal 320 received by the first radar 311 are distinguished from each other by the different coding, the fourth reception signal 321 through the sixth reception signal 323 received by the second radar 312 are distinguished from each other by the different coding, and the seventh reception signal 324 through the ninth reception signal 326 received by the third radar 313 are distinguished from each other by the different coding. The radar image processing apparatus acquires a first captured image from the first radar 311 based on the first reception signal 318 through the third reception signal 320, acquires a second captured image from the second radar 312 based on the fourth reception signal 321 through the sixth reception signal 323, and acquires a third captured image from the third radar 313 based on the seventh reception signal 324 through the ninth reception signal 326. Also, the radar image processing apparatus generates the high-resolution image of the target 314 by synthesizing the first captured image through the third captured image.

Referring to FIG. 3E, a first radar 331 transmits a first transmission signal 341 corresponding to a PN code PN1 via an antenna of a first transmitter $Tx_1$ corresponding to a PN code PN1, and receives, via an antenna of a first receiver $Rx_1$, a first reception signal 351 corresponding to the PN code PN1, a second reception signal 352 corresponding to a PN code PN2, and a third reception signal 353 corresponding to a PN code PN3. The first reception signal 351 corresponds to the first transmission signal 341. The second reception signal 352 corresponds to a second transmission signal 342 transmitted via an antenna of a second transmitter $Tx_2$ of a second radar. The third reception signal 353 corresponds to a third transmission signal 343 transmitted via an antenna of a third transmitter $Tx_3$ of a third radar. The first receiver $Rx_1$ of the first radar 331 includes receivers 332, 333, and 334 that respectively correspond to the PN codes PN1, PN2, and PN3. A radar image processing apparatus sorts data that is based on the first reception signal 351 to a first target range bin 361, sorts data that is based on the second reception signal 352 to a second target range bin 362, and sorts data that is based on the third reception signal 353 to a third target range bin 363. The radar image processing apparatus generates captured images of a target based on the sorted data.

As illustrated in FIG. 3E, the first radar 331 includes a local oscillator that generates a local oscillator signal, and four mixers that receive the local oscillator signal and operate as an upconverter, a first downconverter, a second downconverter, and a third downconverter. The upconverter receives a baseband signal corresponding to the PN code PN1, and upconverts the baseband signal corresponding to the PN code PN1 based on the local oscillator signal to generate the first transmission signal 341 corresponding to the PN code PN1. The first downconverter receives the first reception signal 351 corresponding to the PN code PN1, and downconverts the first reception signal 351 corresponding to the PN code PN1 based on the local oscillator signal to generate a baseband signal corresponding to the PN code PN1. The second downconverter receives the second reception signal 352 corresponding to the PN code PN2, and downconverts the second reception signal 352 corresponding to the PN code PN2 based on the local oscillator signal to generate a baseband signal corresponding to the PN code PN2. The third downconverter receives the third reception signal 353 corresponding to the PN code PN3, and downconverts the third reception signal 353 corresponding to the PN code PN3 based on the local oscillator signal to generate a baseband signal corresponding to the PN code PN3.

The radar image processing apparatus acquires, through a coding technique of a transmission signal using three radars, a quantity of data nine times a quantity of data acquired using one radar. Similarly, the radar image processing apparatus acquires, using four radars, a quantity of data 16 times a quantity of data acquired using one radar, and acquires, using five radars, a quantity of data 25 times a quantity of data acquired using one radar. In response to an increase in a number of radars, the radar image processing apparatus increases a quantity of data for a generation of a high-resolution image of a target by a square of the number of radars, through the coding technique of the transmission signal. Thus, it is possible to increase a resolution performance of an image, and to provide a performance suitable for a generation of an image in real time by simultaneously capturing multiple images.

Figure 4A:
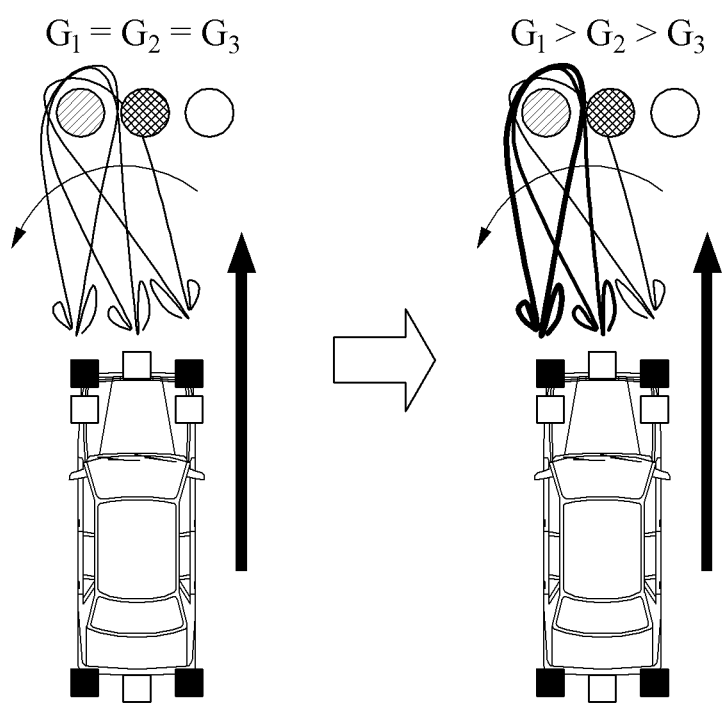
FIG. 4A illustrates an example of a gain diversification of radars.

FIG. 4A illustrates an example of a gain diversification of radars.

A scheme of diversely setting gains is referred to as a "gain diversification." Referring to FIG. 4A, gains of radars are set differently by a gain diversification. When the gains of the radars are set differently, a performance of a detection range and a detection sensitivity increase in comparison to when the gains are set identically. The gains of the radars are diversified based on a predetermined environment, and are controlled in real time or set in advance by a radar image processing apparatus.

In FIG. 4A, $G_1$, $G_2$ and $G_3$ denote gains of radars mounted in a front side of a vehicle, and the radar image processing apparatus sets the gains to $G_1>G_2>G_3$, and increases a detection-related performance. A sum of the gains $G_1=G_2=G_3$ is equal to a sum of the gains $G_1>G_2>G_3$. If $G_1>G_2>G_3$, that is, if the gains are different from each other, a probability of an object being detected by one of the radars increases in comparison to $G_1=G_2=G_3$. For example, an object that is easily detected by a radar with a relatively high gain may not be detected by radars with gains $G_1=G_2=G_3$, but may be detected by a radar with a gain $G_1$ among radars with gains $G_1>G_2>G_3$. Thus, detection performances of the radars increase because of the gain diversification.

The radar image processing apparatus detects an object based on at least one of captured images that are acquired from radars having diversified gains. In response to the object being detected, the radar image processing apparatus generates a high-resolution image that has an object detection range greater than detection ranges of the captured images. For example, the radar image processing apparatus detects an object based on a captured image that is acquired from a radar with a gain $G_1$ among captured images acquired from radars with gains $G_1>G_2>G_3$, and generates a high-resolution image in response to a detection of the object.

Figure 4B:
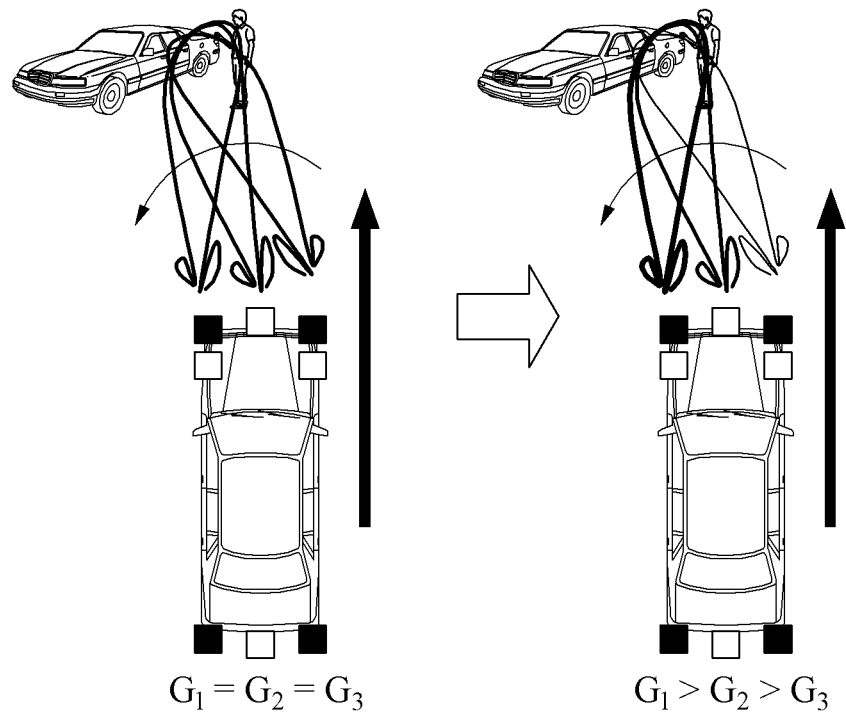
FIG. 4B illustrates another example of a gain diversification of radars.

FIG. 4B illustrates another example of a gain diversification of radars.

Referring to FIG. 4A, a radar image processing apparatus detects both a forward vehicle and a person in front of a vehicle using radars with gains set to $G_1>G_2>G_3$. Because a person and a vehicle have different reflectivities, no signal is detected from radars with gains to $G_1=G_2=G_3$. Generally, a reflectivity of a vehicle is significantly greater than a reflectivity of a person. For example, when a person gets out of a vehicle and gains of radars are set to $G_1=G_2=G_3$ and are high enough that receivers of the radars are saturated due to a reflective signal of the vehicle, both the person and the vehicle are not detected from captured images that are acquired from the radars.

When the gains of the radars are set to $G_1>G_2>G_3$, receivers of radars with gains $G_1$ and $G_2$ are saturated, however, a receiver of a radar with a relatively low gain, that is, a gain $G_3$, is not saturated. Thus, the radar image processing apparatus detects the person and the vehicle from captured images that are acquired from the radars.

Figure 4C:
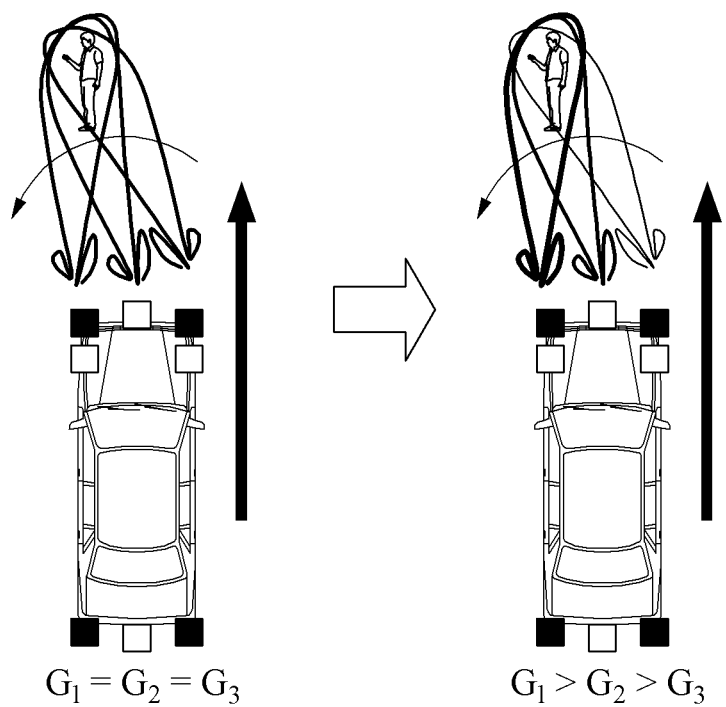
FIG. 4C illustrates another example of a gain diversification of radars.

FIG. 4C illustrates another example of a gain diversification of radars.

Referring to FIG. 4C, a radar image processing apparatus detects a person in front of a vehicle using radars with gains set to $G_1>G_2>G_3$. For example, when a small person is far away from a vehicle, a beam has a low reflectivity. Accordingly, the person is not detected from captured images that are acquired from radars with gains set to $G_1=G_2=G_3$. If gains are set to $G_1>G_2>G_3$, the radar image processing apparatus detects the person using a radar with a relatively high gain, that is, a gain $G_1$.

In one example, when gains of radars are equal to each other, a process of optimizing the gains needs to be repeated several times. In another example, when the gains of the radars are differently set, an amount of time for a process of optimizing the gains is reduced. For example, when gains of three radars are different from each other, an amount of time to optimize the gains is reduced by at least ⅓ in comparison to when the gains are equal. Radars with gains that are differently set are used by the radar image processing apparatus, and thus the radar image processing apparatus is suitable for a real-time control.

Examples in which gains of radars are set may be variously modified or applied based on a design intention. For example, gains of radars forming beams in a traveling path direction are set as normal gains. The normal gains are set within a range that enables a detection of a potential object. When a reception gain of at least one radar among radars set with normal gains converges to a predetermined value, a gain of the radar is set to be low. The radar image processing apparatus may adaptively control gains of radars during driving. Alternatively, the gains of the radars may be automatically controlled.

Figure 5A:
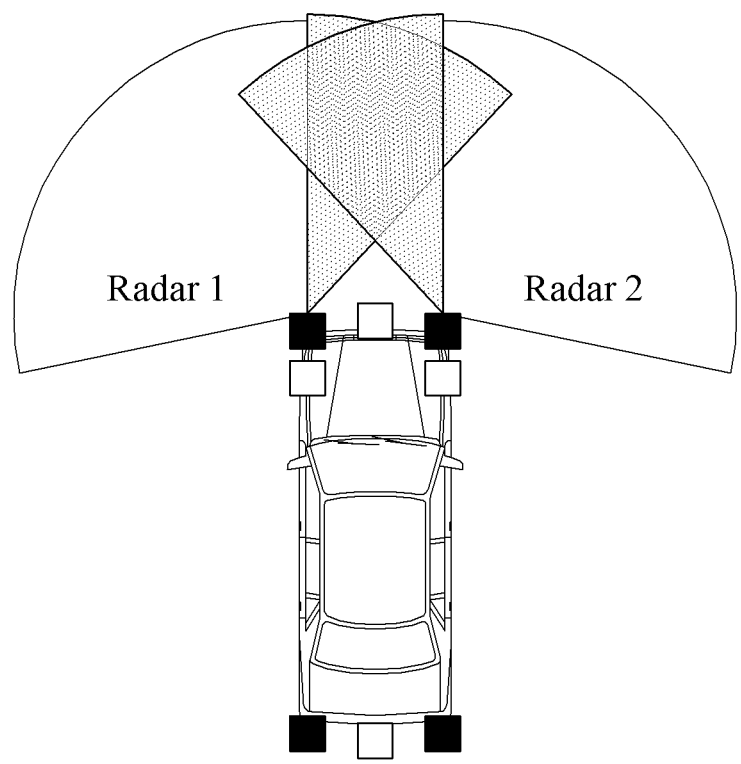
FIGS. 5A and 5B illustrate examples of an operation of controlling a beamforming range of a radar.
Figure 5B:
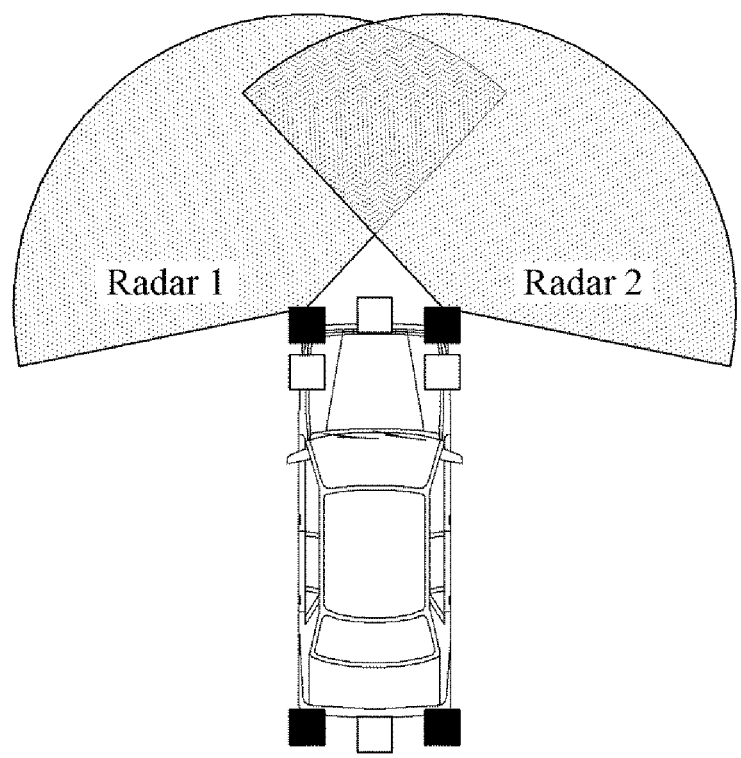

FIGS. 5A and 5B illustrate examples of an operation of controlling a beamforming range of a radar.

Beamforming ranges of radars are controlled depending on situations. For example, a radar image processing apparatus may adaptively control beamforming ranges of radars. The radar image processing apparatus limits or controls the beamforming ranges of the radars in response to a predetermined situation or condition. The radar image processing apparatus determines a current mode among modes, and controls at least one beamforming range of at least one of the radars in response to the current mode. For example, the radar image processing apparatus limits a beamforming range of at least one radar to a front side of a vehicle.

Referring to FIG. 5A, in response to a current mode being a highway-driving mode, the radar image processing apparatus controls beamforming ranges of radars mounted in a front side of a vehicle by limiting the beamforming ranges to the front side. During driving on a highway, it is important to quickly recognize a distance between a vehicle and an object in front of the vehicle and a relative speed between the vehicle and the object. The radar image processing apparatus concentrates power by limiting the beamforming ranges, and increases a long-range detection and recognition performance.

Referring to FIG. 5B, in response to a current mode being a city-driving mode, the radar image processing apparatus controls beamforming ranges of radars mounted in a front side of a vehicle so as to detect a widest range instead of limiting the beamforming ranges. During driving in a city, it is important to accurately recognize surroundings. The radar image processing apparatus maximally extends angle ranges of the beamforming ranges instead of limiting the beamforming ranges, and controls the radars to be suitable for recognition of surroundings.

Although the controlling of the beamforming ranges has been described based on the radars mounted in the front side of the vehicle, the above description is also applicable to any one or any combination of radars mounted in a rear side and both sides of the vehicle. The radar image processing apparatus controls beamforming ranges depending on situations by performing dual radar image processing as described above. An example in which a beamforming range is controlled is not limited to the above description, and various scenarios may be employed based on a design intention.

Figure 5C:
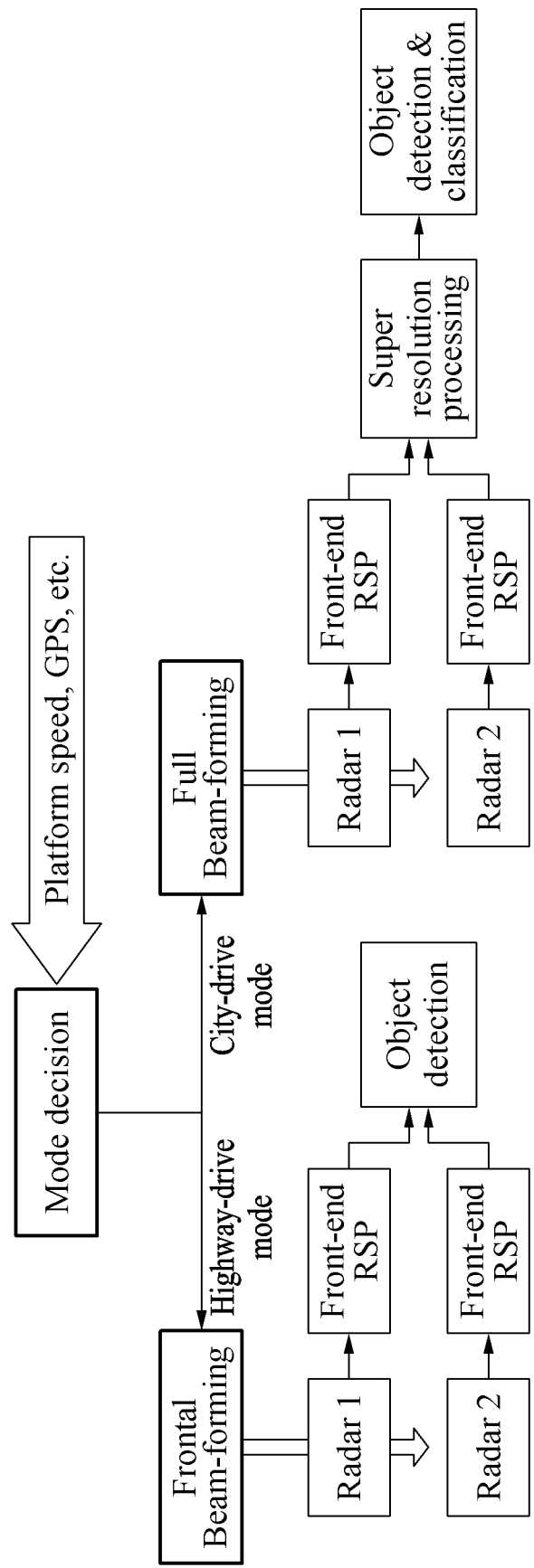
FIG. 5C illustrates another example of an operation of controlling a beamforming range of a radar.

FIG. 5C illustrates another example of an operation of controlling a beamforming range of a radar.

Referring to FIG. 5C, a radar image processing apparatus determines a current mode based on any one or any combination of a speed of a vehicle, an acceleration of the vehicle, a location of the vehicle, and surroundings of the vehicle. In one example, when the current mode is a highway-driving mode, the radar image processing apparatus limits beamforming ranges of radars 1 and 2 to a front side as described above. The radar image processing apparatus performs front-end radar signal processing based on captured images that are acquired from the radars 1 and 2, and detects an object. In the highway-driving mode, the radar image processing apparatus minimizes signal processing associated with the radars 1 and 2, and increases an object detection speed.

In another example, when the current mode is a city-driving mode, the radar image processing apparatus extends the beamforming ranges of the radars 1 and 2 to have a wide angle range, instead of limiting the beamforming ranges, as described above. The radar image processing apparatus performs front-end radar signal processing based on captured images that are acquired from the radars 1 and 2, and generates a high-resolution captured image by overlapping of the captured images. The radar image processing apparatus detects and classifies an object based on the high-resolution captured image. In the city-driving mode, to accurately recognize surroundings, the radar image processing apparatus generates a high-resolution captured image based on information acquired from the radars 1 and 2.

Figure 6:
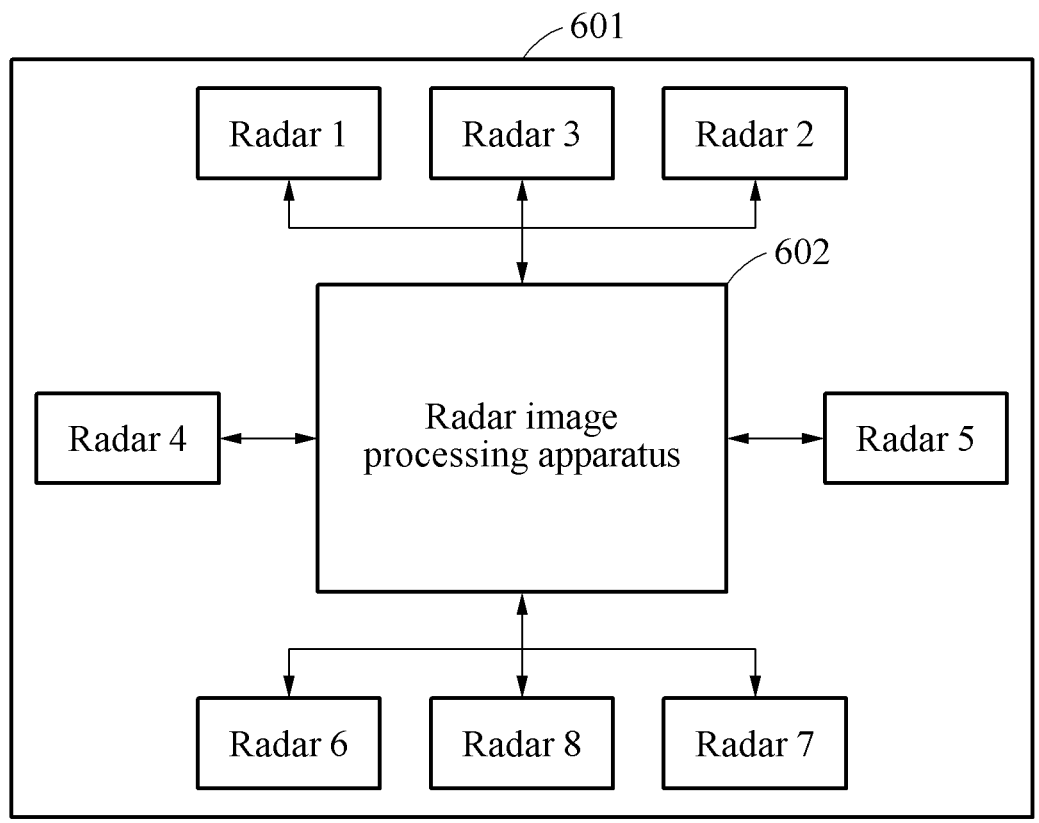
FIG. 6 illustrates an example of a radar image processing system.

FIG. 6 illustrates an example of a radar image processing system.

Referring to FIG. 6, a radar image processing system 601 includes a radar image processing apparatus 602 and radars 1 through 7. Among operations performed in the radar image processing system 601, capturing or scanning operations are performed by the radars, and processing of information acquired from the radars or synchronizing of the radars is performed by the radar image processing apparatus 602.

Because operations of a feature extraction and general radar processing such as two-dimensional (2D) fast Fourier transform (FFT) are simple and have relatively low processing loads, the radars perform these operations. Operations of processing information collected from the radars, controlling beamforming of the radars, and generating a high-resolution image using a processing technique of an SAR is performed by the radar image processing apparatus 602 due to a relatively high processing load of these operations. As described above, the radar image processing apparatus 602 generates a high-resolution image with a 360-degree angle range based on captured images that are acquired from synchronized radars, detects and recognizes an object, and tracks a movement of the object. The radar image processing system 601 is designed to be suitable to process radar images in real time by having the radar image processing apparatus 602 perform relatively complex processing operations, and having the radars perform relatively simple operations. The examples described above with respect to FIGS. 1 through 5C are also applicable to the operations of the radar image processing system 601, and accordingly are not repeated here.

Figure 7:
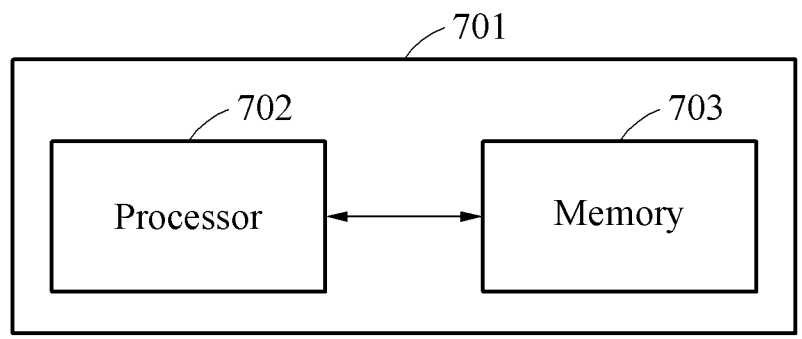
FIG. 7 illustrates an example of a radar image processing apparatus.

FIG. 7 illustrates an example of a radar image processing apparatus.

Referring to FIG. 7, a radar image processing apparatus 701 includes a processor 702 and a memory 703. The memory 703 stores instructions that are associated with radar image processing or radar control, or stores instructions to perform the operations described above with reference to FIGS. 1 through 6. Also, the memory 703 stores information acquired from radars.

The processor 702 loads and executes the instructions stored in the memory 703. The examples described above with respect to FIGS. 1 to 6 are also applicable to operations of the processor 702, and accordingly are not repeated here.

Figure 8:
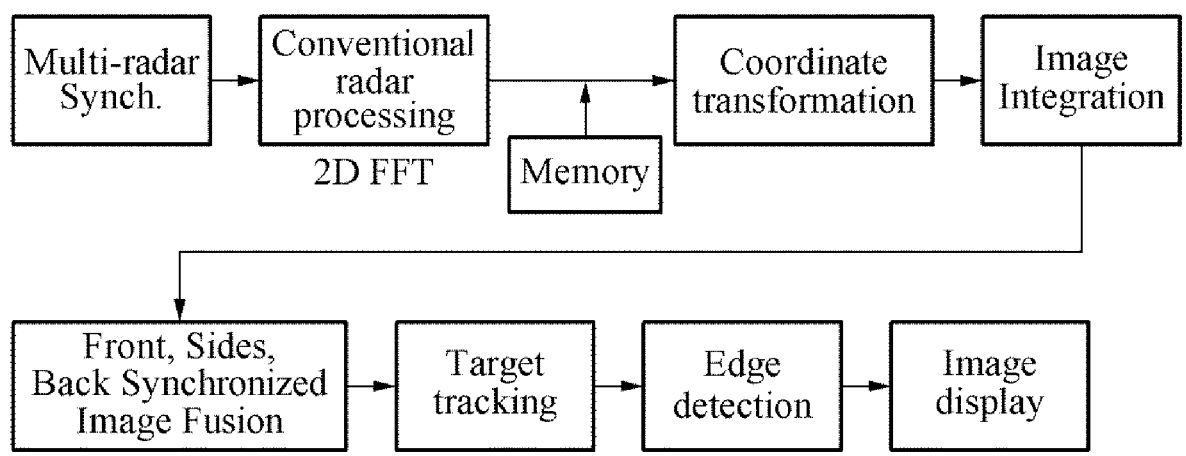
FIG. 8 illustrates an example of an operation of processing a radar image.

FIG. 8 illustrates an example of an operation of processing a radar image.

Referring to FIG. 8, radars are synchronized as described above. The synchronized radars perform general radar processing. A radar image processing apparatus performs coordinate transformation of captured images that are acquired from the radars based on information stored in a memory, and performs image integration. The radar image processing apparatus synthesizes captured images corresponding to a front side, a rear side, and both sides of a vehicle, and generates a high-resolution image based on the synthesized images. The radar image processing apparatus tracks a target based on the high-resolution image, detects an edge, and displays an image. The examples described above with respect to FIGS. 1 to 7 are also applicable to the radar image processing operation of FIG. 8, and accordingly are not repeated herein.

The radars 202 and 203 in FIG. 2A, the radars 205 and 206 in FIG. 2B, the radars, the virtual MIMO radar, the transmitter array, and the receiver array in FIG. 3A, the radars in FIG. 3C, the radars 311, 312, and 313 and the other unnumbered radars in FIG. 3D, the radar 331 that includes the transmitter $Tx_1$ and the receiver $Rx_1$, the unnumbered radar that includes the transmitter $Tx_2$ and the receiver $Rx_2$, the unnumbered radar that includes the transmitter $Tx_3$ and the receiver $Rx_3$, the transmitters $Tx_1$, $Tx_2$, and $Tx_3$, the receivers $Rx_1$, $Rx_2$, and $Rx_3$, the receivers 332, 333, and 334 that are included in the receiver $Rx_1$, the three unnumbered receivers that are included in the receiver $Rx_2$, the unnumbered three receivers that are included in the receiver $Rx_3$, the target range bins 361, 362, and 363, the unnumbered oscillator, and the unnumbered mixers in FIG. 3E, the radars in FIGS. 4A, 4B, 4C, 5A, 5B, and 5C, the radar image processing system 601, the radar image processing apparatus 602, and the radars in FIG. 6, the radar image processing apparatus 701, the processor 702, and the memory 703 in FIG. 7, and the memory in FIG. 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2A, 2B, 3A, 3B, 3C, 3D, 3E, 4A, 4B, 4C, 5A, 5B, 5C, and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A radar image processing method comprising:
    acquiring captured images from radars synchronized with each other to perform beamforming on a same point at a same time, wherein the radars comprise one or more long-range radars (LRR) and one or more short-range radars (SRR), and wherein at least one of the LRRs is mounted on a first front side of a vehicle and at least one of the SRRs is mounted on a second front side, different from the first front side, of the vehicle;
    synthesizing the captured images based on at least one overlapping area of the captured images, wherein an angle range of the overlapping area satisfies a predetermined condition; and
    generating a high-resolution image based on the synthesized images,
    wherein the at least one of the LRRs transmits a first main beam pattern and the at least one of the SRRs transmits a second main beam pattern.

2. The radar image processing method of claim 1, wherein the radars are synchronized with each other to sequentially perform beamforming on points at a same distance from a vehicle.

3. The radar image processing method of claim 1, wherein the radars are synchronized with each other to sequentially perform beamforming on points at different locations relative to a vehicle along a predefined path.

4. The radar image processing method of claim 1, wherein transmission times for transmitting transmission signals from the radars toward a target are synchronized with each other, and
    reception times for receiving reflection signals generated by the transmission signals reflecting from the target toward the radars are synchronized with each other.

5. The radar image processing method of claim 1, wherein the radars form a multiple-input and multiple-output (MIMO), and
    at least one of the radars comprises a virtual MIMO radar.

6. The radar image processing method of claim 1, wherein transmission signals transmitted from the radars toward a target are coded differently from one another,
    a first radar among the radars is configured to receive first reception signals respectively generated by the transmission signals reflecting from the target, and
    a second radar among the radars is configured to receive second reception signals respectively generated by the transmission signals reflecting from the target.

7. The radar image processing method of claim 6, wherein the acquiring of the captured images comprises:
    acquiring a first captured image from the first radar based on the first reception signals; and
    acquiring a second captured image from the second radar based on the second reception signals.

8. The radar image processing method of claim 1, wherein at least one of the radars is installed to scan any one or any combination of a front side of a vehicle, a rear side of the vehicle, and both sides of the vehicle.

9. The radar image processing method of claim 1, wherein gains of at least two of the radars are different from one another, and
    the radar image processing method further comprises detecting an object based on at least one of the captured images acquired from the radars having the different gains.

10. The radar image processing method of claim 9, wherein the generating of the high-resolution image comprises generating, in response to the object being detected, a high-resolution image having an object detection range greater than respective object detection ranges of the captured images.

11. The radar image processing method of claim 1, further comprising:
    determining a current mode among modes; and
    controlling a beamforming range of at least one of the radars based on the current mode.

12. The radar image processing method of claim 11, wherein the controlling of the beamforming range comprises limiting the beamforming range to a front side of a vehicle.

13. The radar image processing method of claim 11, wherein the determining of the current mode comprises determining the current mode based on any one or any combination of a speed of a vehicle, an acceleration of the vehicle, a location of the vehicle, and surroundings of the vehicle, and the modes comprise a highway-driving mode and a city-driving mode.

14. A non-transitory computer-readable medium storing instructions that, when executed by a processor, cause the processor to perform the method of claim 1.

15. A radar image processing apparatus comprising:
a memory configured to store instructions; and
a processor configured execute the instructions stored in the memory to:
   acquire captured images from radars synchronized with each other to perform beamforming on a same point at a same time,
   synthesize the captured images based on at least one overlapping area of the captured images, wherein an angle range of the overlapping area satisfies a pre-determined condition, and
generate a high-resolution image based on the synthesized images,
wherein the radars comprise one or more long-range radars (LRR) and one or more short-range radars (SRR),
at least one of the LRRs is mounted on a first front side of a vehicle and at least one of the SRRs is mounted on a second front side, different from the first front side, of the vehicle, and
the at least one of the LRRs transmits a first main beam pattern and the at least one of the SRRs transmits a second main beam pattern.

16. The radar image processing apparatus of claim 15, wherein the processor is further configured to synchronize the radars with each other to sequentially perform beamforming on points at a same distance from a vehicle.

17. The radar image processing apparatus of claim 15, wherein the processor is further configured to synchronize the radars with each other to sequentially perform beamforming on points at different locations relative to a vehicle along a predefined path.

18. The radar image processing apparatus of claim 15, wherein the processor is further configured to:
set gains of at least two of the radars to be different from one another, and
detect an object based on at least one of the captured images acquired from the radars.

19. The radar image processing apparatus of claim 15, wherein the processor is further configured to:
determine a current mode among modes, and
control a beamforming range of at least one of the radars based on the current mode.

20. The radar image processing apparatus of claim 15, wherein the radars form a multiple-input and multiple-output (MIMO),
the processor is further configured to control the radars of the MIMO, and
at least one of the radars comprises a virtual MIMO radar.

21. A radar image processing system comprising:
radars;
a memory configured to store instructions; and
a processor configured to execute the instructions stored in the memory to:
   synchronize the radars with each other to perform beamforming on a same point at a same time,
   acquire captured images from the radars,
   synthesize the captured images based on at least one overlapping area of the captured images, wherein an angle range of the overlapping area satisfies a pre-determined condition, and
   generate a high-resolution image based on the synthesized images,
wherein the radars comprise one or more long-range radars (LRR) and one or more short-range radars (SRR),
at least one of the LRRs is mounted on a first front side of a vehicle and at least one of the SRRs is mounted on a second front side, different from the first front side, of the vehicle, and
the at least one of the LRRs transmits a first main beam pattern and the at least one of the SRRs transmits a second main beam pattern.

22. A radar image processing method comprising:
acquiring captured images from radars mounted on a platform, the radars comprising:
   a first long-range radar (LRR) mounted at a front of the platform;
   a second LRR mounted at a rear of the platform;
   a first short-range radar (SRR) mounted at the front of the platform on one side of the first LRR;
   a second SRR mounted at the front of the platform on an opposite side of the first LRR from the first SRR;
   a third SRR mounted at one side of the platform between the front of the platform and the rear of the platform;
   a fourth SRR mounted at an opposite side of the platform from the one side of the platform between the front of the platform and the rear of the platform;
   a fifth SRR mounted at the rear of the platform on one side of the second LRR; and
   a sixth SRR mounted at the rear of the platform on an opposite side of the second LRR from the fifth LRR;
synthesizing the captured images based on overlapping areas of the captured images to obtain an image having a 360° field of view; and
generating a high-resolution image based on the synthesized images.

23. The radar image processing method of claim 22, wherein the first LRR, the first SRR, and the second SRR are synchronized with each other to perform beamforming on a same point at a same time; and
the generating of the high-resolution image comprises generating a high-resolution image of an area in front of the platform based on captured images acquired by the first LRR, the first SRR, and the second SRR synchronized with each other.

24. The image processing method of claim 23, wherein gains of the first LRR, the first SRR, and the second SRR are different from each other.

25. The image processing method of claim 23, wherein the first SRR transmits a first transmission signal toward a target;
the first LRR transmits a second transmission signal toward the target;
the second SRR transmits a third transmission signal toward the target;
the acquiring of the captured images comprises:
   acquiring a first reception image from the first SRR based on a first reception signal received by the first SRR and generated by the first transmission signal reflecting from the target, a second reception signal received by the first SRR and generated by the second transmission signal reflecting from the target, and a third reception signal received by the first SRR and generated by the third transmission signal reflecting from the target;

acquiring a second reception image from the first LRR based on a fourth reception signal received by the first LRR and generated by the first transmission signal reflecting from the target, a fifth reception signal received by the first LRR and generated by the second transmission signal reflecting from the target, and a sixth reception signal received by the first LRR and generated by the third transmission signal reflecting from the target; and acquiring a third reception image from the second SRR based on a seventh reception signal received by the second SRR and generated by the first transmission signal reflecting from the target, an eighth reception signal received by the second SRR and generated by the second transmission signal reflecting from the target, and a ninth reception signal received by the second SRR and generated by the third transmission signal reflecting from the target; and the generating of the high-resolution image comprises generating the high-resolution image based on the first reception image, the second reception image, and the third reception image.

26. The image processing method of claim 23, further comprising:

controlling beamforming ranges of the first SRR, the first LRR, and the second SRR to limit the beamforming ranges of the first SRR, the first LRR, and the second SRR to an area in front of the platform in a highway-driving mode; and controlling beamforming ranges of the first SRR, the first LRR, and the second SRR to be maximum beamforming ranges of the first SRR, the first LRR, and the second SRR in a city-driving mode.

* * * * *